United States Patent
Croshier

(10) Patent No.: US 11,207,586 B1
(45) Date of Patent: Dec. 28, 2021

(54) COMPARTMENTED SKI CARRIER

(71) Applicant: Mark Croshier, Coronado, CA (US)

(72) Inventor: Mark Croshier, Coronado, CA (US)

(*) Notice: Subject to any disclaimer, the term of this patent is extended or adjusted under 35 U.S.C. 154(b) by 182 days.

(21) Appl. No.: 16/807,268

(22) Filed: Mar. 3, 2020

(51) Int. Cl.
*A63C 11/02* (2006.01)
*B60R 9/045* (2006.01)
*B60R 9/048* (2006.01)

(52) U.S. Cl.
CPC .......... *A63C 11/027* (2013.01); *A63C 11/025* (2013.01); *B60R 9/045* (2013.01); *B60R 9/048* (2013.01)

(58) Field of Classification Search
CPC ......... A63C 11/027; B60R 9/12; B60R 9/045; B60R 9/048
See application file for complete search history.

(56) References Cited

U.S. PATENT DOCUMENTS

| | | | | |
|---|---|---|---|---|
| 3,325,069 A | * | 6/1967 | Fulton | A63C 11/027 224/315 |
| 3,921,871 A | * | 11/1975 | Heil | A63C 11/027 224/250 |
| 4,071,176 A | * | 1/1978 | Tuzee | B60R 9/12 211/70.5 |
| 4,084,735 A | * | 4/1978 | Kappas | B60R 9/055 211/70.5 |
| 4,402,355 A | * | 9/1983 | Wymore | A63C 11/027 206/315.1 |
| 4,643,302 A | * | 2/1987 | Baumgardner | A45C 3/00 190/105 |
| 4,860,935 A | * | 8/1989 | Pavlinsky | A63C 11/027 224/615 |
| 4,867,307 A | * | 9/1989 | Bovee | A63C 11/027 206/315.1 |
| 4,953,773 A | * | 9/1990 | Wirth | A63C 11/027 206/315.1 |
| 4,955,519 A | * | 9/1990 | Forrester | A63C 11/027 224/315 |
| 5,005,743 A | * | 4/1991 | Ramsay | A45C 7/0031 190/104 |
| 5,096,104 A | * | 3/1992 | Wirth | A63C 11/027 206/315.1 |
| D333,724 S | * | 3/1993 | Dimacopoulos | D3/259 |
| 5,285,942 A | * | 2/1994 | Wills | A63C 11/026 220/4.22 |
| 5,490,621 A | * | 2/1996 | Dixon | B60R 9/12 224/319 |
| 5,538,137 A | * | 7/1996 | Deioma | A63C 11/025 206/579 |

(Continued)

*Primary Examiner* — Jeffrey J Restifo
(74) *Attorney, Agent, or Firm* — Sanchelima & Associates, P.A.; Christian Sanchelima; Jesus Sanchelima

(57) ABSTRACT

A ski carrier is disclosed herein. The ski carrier includes a housing having a cylindrical shape with rounded ends. The housing further includes a latch located along a center portion that opens to reveal a mounting assembly located within the housing. The mounting assembly includes two rotatable cylinders that are connected through a central rod. The cylinders include clips that receive ski poles to be mounted and stored within the housing. The housing further includes a first compartment and a second compartment that is movable to reveal additional storage for skiing accessories such as gloves, boots, and googles. Additionally, the housing may be mounted on to the top of a vehicle for easy transport.

11 Claims, 5 Drawing Sheets

(56) References Cited

U.S. PATENT DOCUMENTS

| | | | | |
|---|---|---|---|---|
| 5,673,832 | A * | 10/1997 | Whalen | B60R 9/12 |
| | | | | 224/309 |
| 5,799,848 | A * | 9/1998 | Wills | A63C 11/026 |
| | | | | 224/328 |
| 6,015,074 | A * | 1/2000 | Snavely | B60R 9/042 |
| | | | | 224/310 |
| 6,311,883 | B1 * | 11/2001 | Greenberg | A63C 11/025 |
| | | | | 206/315.1 |
| 6,827,245 | B1 * | 12/2004 | Yetka | B60R 9/12 |
| | | | | 224/316 |
| 9,688,210 | B2 * | 6/2017 | Fritsche | B60R 9/055 |
| 10,118,083 | B2 * | 11/2018 | Ford | A63C 11/023 |
| 2007/0205240 | A1 * | 9/2007 | Castro | B60R 9/048 |
| | | | | 224/328 |
| 2021/0129763 | A1 * | 5/2021 | Schwartz | B60R 9/058 |

* cited by examiner

COMPARTMENTED SKI CARRIER

BACKGROUND OF THE INVENTION

1. Field of the Invention

The present invention relates to a carrier storage device and, more particularly, to a carrier storage device for ski equipment that can be mounted onto a vehicle and holds various skis and ski accessories.

2. Description of the Related Art

Several designs for a compartmented ski boot have been designed in the past. None of them, however, include a compartmented ski, boot, and accessories carrier. The ski carrier includes a housing having a cylindrical shape with rounded ends. The housing further includes a latch located along a center portion that opens to reveal a mounting assembly located within the housing. The mounting assembly includes two rotatable cylinders that are connected through a central rod. The cylinders include clips that receive ski poles to be mounted and stored within the housing. The housing further includes a first compartment and a second compartment that is removable to reveal additional storage for skiing accessories such as gloves, boots, and googles. Additionally, the housing may be mounted on to the top of a vehicle for easy transport. It is known that individuals who often enjoy skiing often have the need to transport a variety of skis from location to location. It is also known that transporting skis and ski accessories such as gloves and boots often require a significant amount of space. Therefore, there is a need for a ski carrier that allows a user to transport a variety of skis and additional ski accessories. The present invention allows for the ease of transportation and storage for ski and ski accessories.

Applicant believes that a related reference corresponds to U.S. Pat. No. 5,096,104 issued for a ski carrier in the form of an aerodynamically shaped tube having sufficient rigidity to protect the skis. Applicant believes that another related reference corresponds to U.S. Pat. No. 5,538,137 issued for a combination ski and boot bag that includes a generally tubular shaped main portion and includes at least two satellite boot compartments that are connected to the outside of the main portion. However, the cited references differ from the present invention because they fail to disclose the novel aspects of the mounting assembly located within the housing assembly. The references lack a mounting assembly having two cylindrical sprockets connected by an elongated rod that then receives ski members through clips. This configuration aids in providing a user with the most optimized and easy to use method for storing their ski equipment. The present invention implements these features in a novel configuration that is not taught by the cited references.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a ski carrier having a unique rotatable mounting assembly that allows a user to attach and store various ski items to the mounting assembly for efficient storage.

It is another object of this invention to provide a ski carrier having two removable compartments that allows a user to store ski accessories such as gloves, boots, and ski googles.

It is still another object of the present invention to provide a ski carrier that is mountable onto a vehicle for ease of transportation.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
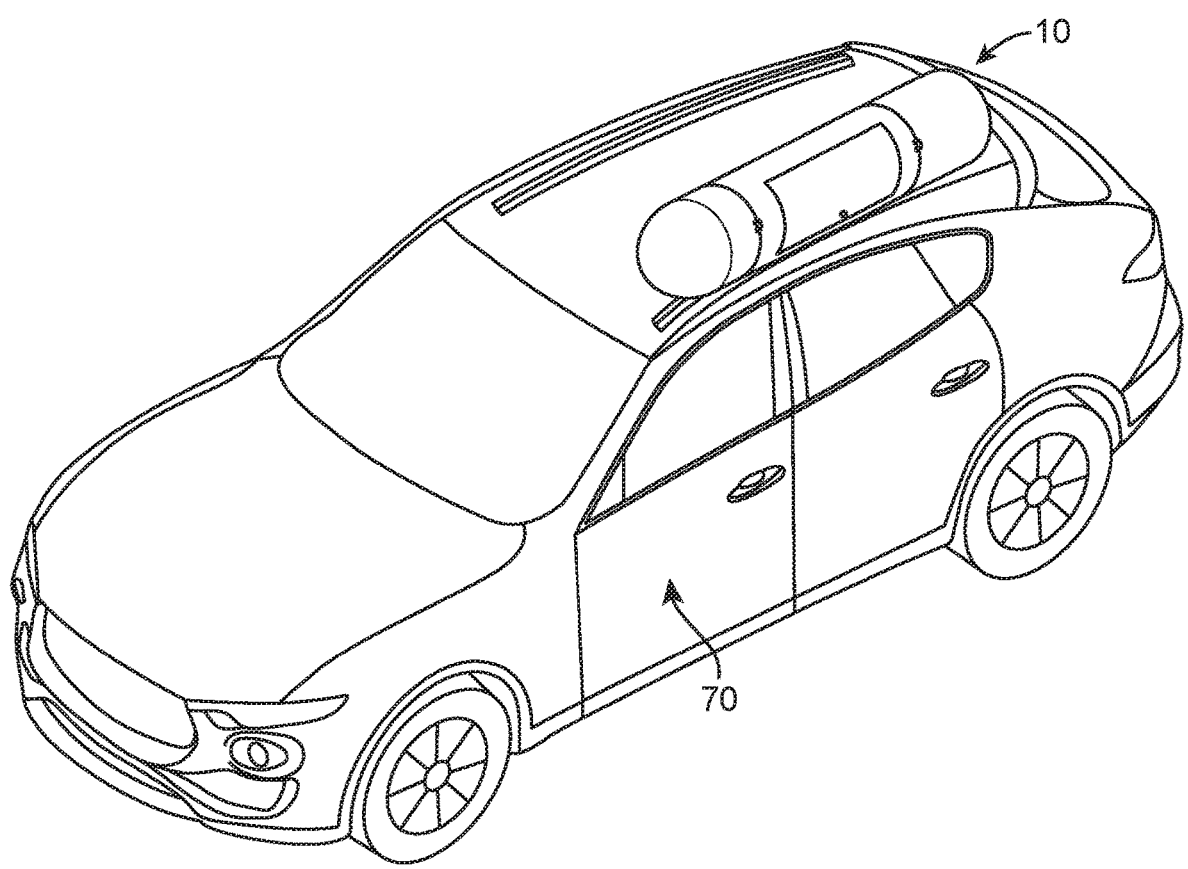
FIG. 1 represents an operational view of ski carrier and storage unit 10 mounted onto vehicle 70 in accordance with an embodiment of the present invention.
Figure 2:
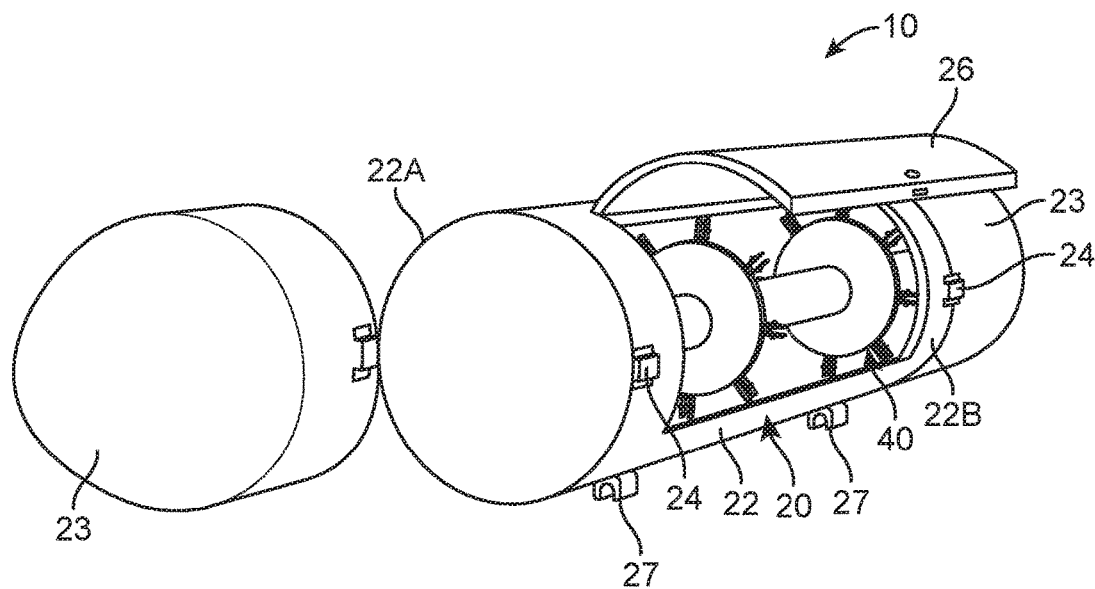
FIG. 2 shows an isometric exploded view of ski carrier 10 depicting various elements of housing assembly 20 and mounting assembly 40 in accordance with an embodiment of the present invention.
Figure 3:
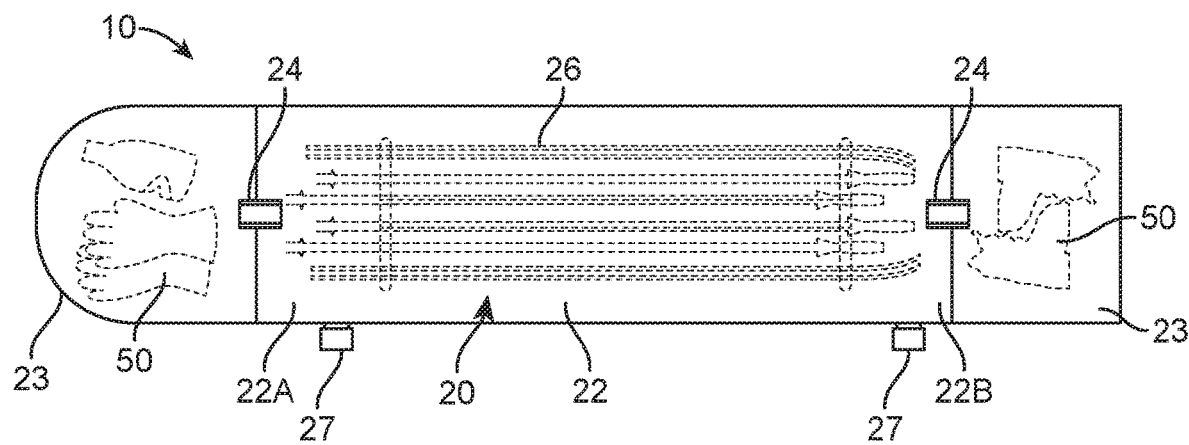
FIG. 3 illustrates an internal side view of housing assembly 20 depicting ski equipment 50 mounted therein in accordance to an embodiment of the present invention.
Figure 4:
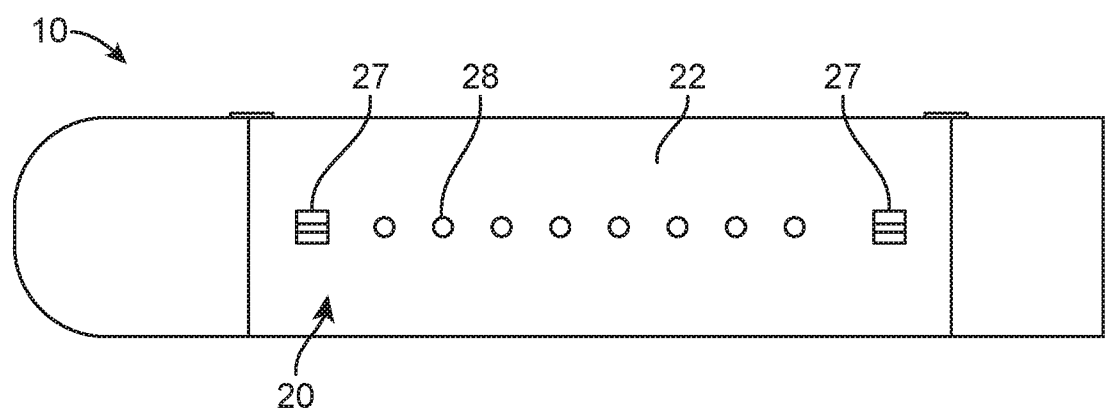
FIG. 4 is a representation of a bottom view of housing assembly 20 depicting drain openings 28 configured along a bottom end of a body 22 in accordance to an embodiment of the present invention.

Referring now to the drawings, where the present invention is generally referred to with numeral 10, it can be observed a ski carrier 10 including a housing assembly 20 and a mounting assembly 40.

Figure 5:
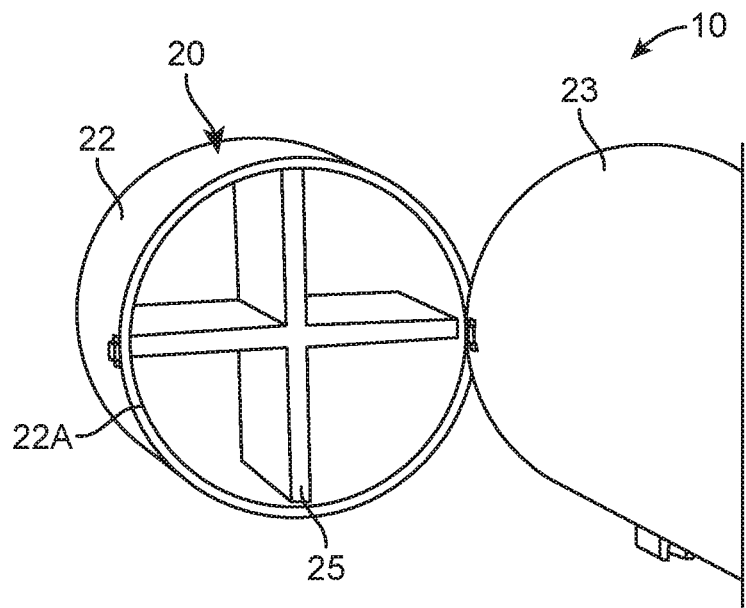
FIG. 5 shows an enlarged view of compartments 23 having a storage divider 25 therein in accordance to an embodiment of the present invention.
Figure 6:
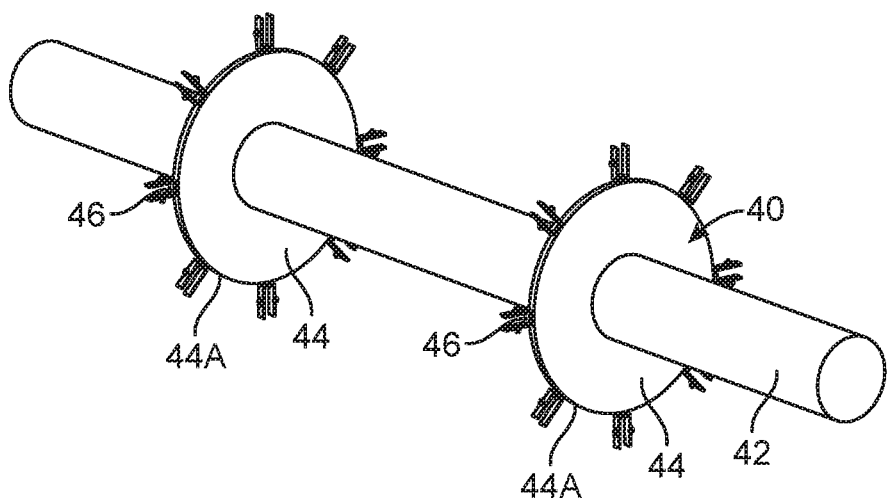
FIG. 6 illustrates an isometric view of mounting assembly 40 in accordance to an embodiment of the present invention.
Figure 7:
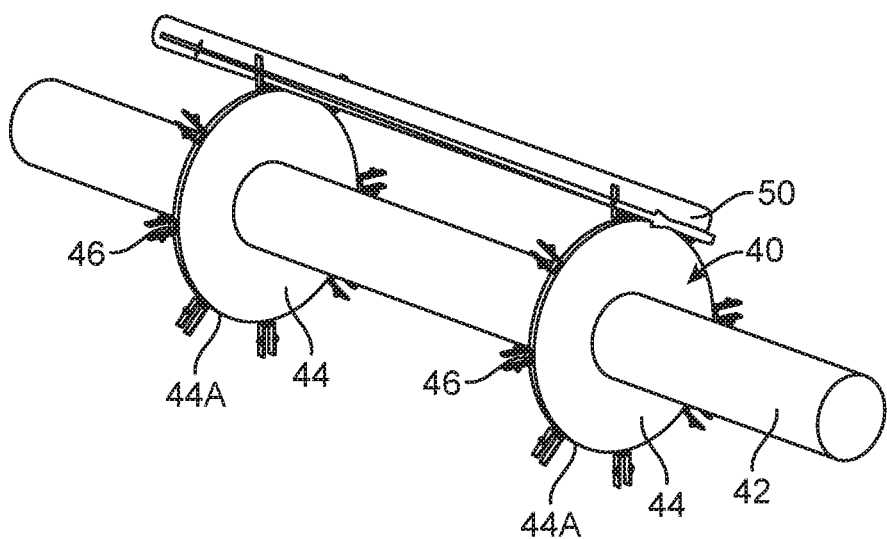
FIG. 7 represents an isometric operational view of mounting assembly 40 having ski equipment 50 mounted thereon.
Figure 8:
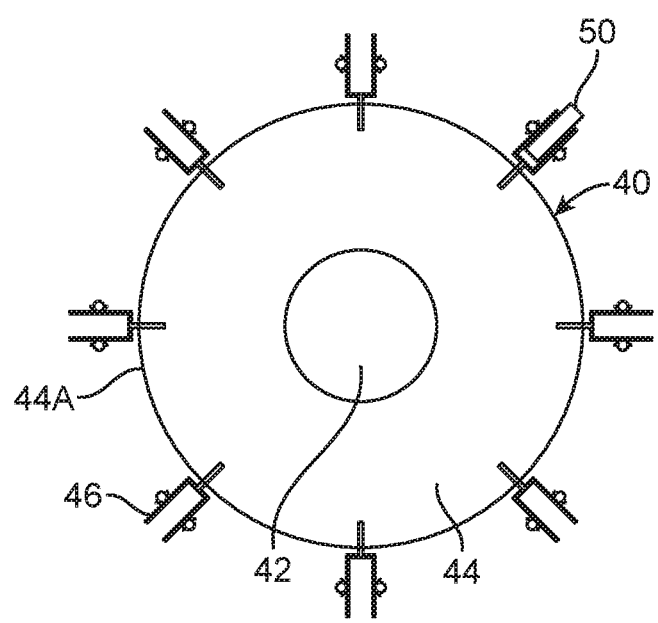
FIG. 8 shows a side operational view of mounting assembly 40 having ski equipment 50 mounted thereon.

Housing assembly 20 includes a body 22 having a first end 22A and a second end 22B. The body 22 is used to store ski equipment 50 therein. In one embodiment, body 22 has a uniform cylindrical shape and first end 22A and second end 22B are represented by the flat ends of the uniform cylinder. The provided drawings depict body 22 having this configuration. However, other embodiments may feature body 22 of varying shapes and sizes. Body 22 may also include compartments 23 attached to the corresponding first end 22A and second end 22B. Compartments 23 may be provided as additional housing that provides additional space to a user for storage. It can be observed in the drawings, a body having two of compartments 23. Each of these two compartments has a distinct shape to each other. In one embodiment, a compartment 23 attached to first end 22A includes a dome like shape that may allow users to store items of significant size such as gloves and googles. Additionally, a compartment 23 is attached to second end 22B and may have a cylindrical shape that includes a flat bottom end. Other embodiments may omit compartments 23 from body 22 or include compartments 23 of varying size and shape. In the present embodiment, compartments 23 are attached to body 22 through latches 24 that are mounted on body 22. In one implementation, compartments 23 are hingedly and rotatably mounted thereon such that they may swing to one side to reveal additional storage therein. In one embodiment latches 24 are located on each of first end 22A and second end 22B. Additionally, they may be placed on opposing sides thereon each end. Latches 24 may be any suitable latch known in the art of locking mechanisms. In the present embodiment, body 22 and compartments 23 hold ski equipment 50. Ski equipment 50 may include but is not limited to various forms of hardware such as gloves, boots, and googles. In one embodiment, body 22 is utilized to hold skis and ski poles that are mounted onto the mounting assembly 40 within the body 22. Additionally, compartments 23 may be utilized to store a variety of other equipment such as gloves, boots, and googles and other equipment used in the sport of skiing. Compartments 23 may further include a storage divider 25 as depicted in FIG. 5. In one embodiment, storage divider 25 may be a cross shaped divider that separates the inner space into compartments to store various equipment. Storage divider 25 may be integral or removable to compartments 23. Additionally, it should be understood, storage divider 25 may be included to each of compartments 23 or be omitted from each of compartments 23.

Housing assembly 20 further includes a curved door 26 hingedly mounted onto an outer surface of body 22. In one embodiment, curved door 26 is arc-shaped in nature to match the cylindrical shape of body 22. Additionally, curved door 26 may extend the entire length of body 22. Curved door 26 provides a user with easy access to an interior space of body 22 to then collect the ski equipment 50 that may be stored therein. In one embodiment, a single curved door 26 is mounted onto body 22. In other embodiments, two doors mounted on each opposite end are included to provide a user with greater access to their equipment. Body 22 further includes a bottom end having railing clips 27 mounted thereon. In one embodiment, railing clips 27 are suitable clips used to mount ski carrier 10 onto vehicle 70. In one embodiment, vehicle 70 includes a roof having a railing. Railing clips 27 are then couple to the railing of the roof the vehicle to create a secure attachment. This allows a user to easily transport ski carrier 10 at their convenience. The bottom end of body 22 may further include drain openings 28. In one embodiment, drain openings 28 are circular openings that are located in an adjacent configuration along the bottom end. It is known that ski equipment 50 may often have snow debris on the equipment after use. As a result, the snow debris may begin to melt once inserted into body 22. Drain openings 28 allow the water that results from this snow to escape from body 22.

Mounting assembly 40 includes an elongated rod 42 mounted within body 22. In one embodiment, elongated rod 42 is a rotatable cylindrical rod extending from first end 22A to second end 22B of body 22. In one embodiment, elongated rod 42 is rotatable through bearings placed on each end of the elongated rod when mounted within body 22. Cylindrical members 44 are then mounted to the elongated rod 42 and then spaced apart a predetermined distance. In one embodiment, elongated rod 42 passes through the center portion of each of cylindrical members 44. The present embodiment depicts mounting assembly 40 having two cylindrical members 44. However, additional embodiments may include more than two cylindrical members to provide ski equipment 50 with additional support. Additionally, cylindrical members 44 may be provided in a hollow or solid configuration. Cylindrical members 44 further include an outer surface area 44A. This outer surface area 44A further includes attachment members 46 mounted thereon. In one embodiment, attachment members 46 extend outwardly from outer surface area 44A and are located along the entire circumference of cylindrical members 44 spaced accordingly to receive the ski/pole units. Attachment members 46 may be provided as clips to receive ski equipment 50 being skis and ski poles as a unit. Furthermore, attachment members 46 almost entirely cover the ski when mounted thereon. Additional embodiments may include other attachment members that are suitable to receive ski equipment 50. In one embodiment, attachment members 46 are optimized to receive ski and ski poles. Additionally, ski equipment 50 is mounted in a horizontal configuration within body 22 and secured within mounting assembly 40. Ski carrier 10 provides a user with the best solution to transport and store ski equipment.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a ski carrier, comprising:
   a. a housing assembly including a body having a first end and a second end, said first end and said second end including compartments attached thereon, a curved door hingedly mounted along an outer surface of said body, said body having a bottom end including drain openings; and
   b. a mounting assembly including an elongated rod extending within a center portion of said body, wherein said elongated rod is rotatable, wherein said elongated rod includes at least one cylindrical member attached thereon, said cylindrical member including an outer surface area having attachment members located thereon.

2. The system for a ski carrier of claim 1 wherein said compartments include storage dividers and stores gloves and boots therein.

3. The system for a ski carrier of claim 1 wherein said body is cylindrical in shape.

4. The system for a ski carrier of claim 1 wherein said body includes latches to couple said compartments to said first end and said second end.

5. The system for a ski carrier of claim 1 wherein said curved door extends the entire length of said body.

6. The system for a ski carrier of claim 1 wherein said drain openings are adjacently disposed along said bottom end.

7. The system for a ski carrier of claim 1 wherein said bottom end of said body includes rail clippings to be attached to a vehicle.

8. The system for a ski carrier of claim 1 wherein said elongated rod extends from said first end to said second end.

9. The system for a ski carrier of claim 1 wherein said attachment members are clips.

10. The system for a ski carrier of claim 1 wherein said attachment members receive skis and poles as a unit to be stored within said body in a horizontal position.

11. A system for a ski carrier, comprising:
a. a vehicle including a roof having a railing;
b. ski equipment including skis, poles, gloves, and boots;
c. a housing assembly including a cylindrical body having a first end and a second end, a first compartment having a dome shape attached to said first end, said first compartment attached to said first end through latches, a second compartment having a cylindrical shape with a flat bottom end attached to said second end, wherein said second compartment is attached to said second end through said latches, wherein said first compartment and said second compartment include a cross shaped storage divider to receive said gloves and boots therein, said cylindrical body having a curved hinged door that provides access to an internal space within said cylindrical body, said cylindrical body including a bottom surface having two railing clips, wherein said two railing clips are received by said railing of said roof, said bottom surface further including drain openings; and
d. a mounting assembly including an elongated rod extending a length of said internal space of said cylindrical body, wherein said elongated rod is rotatable, elongated rod having a first cylinder and a second cylinder including a center portion, wherein said elongated rod is mounted through said center portion of said first cylinder and said second cylinder, said first cylinder and said second cylinder having an outer surface area having clips mounted thereon, wherein said clips receive said skis, wherein said skis are mounted in a horizontal configuration within said cylindrical body.

* * * * *